(12) United States Patent
Ishibashi (10) Patent No.: US 9,494,796 B2
(45) Date of Patent: Nov. 15, 2016

(54) VEHICLE DISPLAY DEVICE

(71) Applicant: Yazaki Corporation, Tokyo (JP)

(72) Inventor: Shuichi Ishibashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 271 days.

(21) Appl. No.: 14/529,735

(22) Filed: Oct. 31, 2014

(65) Prior Publication Data

US 2015/0055098 A1 Feb. 26, 2015

Related U.S. Application Data (63) Continuation of application No. PCT/JP2013/002910, filed on May 1, 2013.

(30) Foreign Application Priority Data

May 9, 2012 (JP) .................................. 2012-107476

(51) Int. Cl.
*G02B 27/01* (2006.01)
*B60K 35/00* (2006.01)
*B60K 37/04* (2006.01)
(Continued)

(52) U.S. Cl.
CPC .......... *G02B 27/0149* (2013.01); *B60K 35/00* (2013.01); *B60K 37/04* (2013.01); *G03B 21/10* (2013.01); *G03B 21/145* (2013.01); *B60K 2350/2052* (2013.01); *B60K 2350/405* (2013.01); *G02B 2027/015* (2013.01); *G02B 2027/0154* (2013.01); *G02B 2027/0156* (2013.01); *G02B 2027/0161* (2013.01)

(58) Field of Classification Search
CPC .................. G02B 27/0149; G02B 2027/0156; G02B 2027/0154; B60K 2350/2052; B60K 2350/405
See application file for complete search history.

(56) References Cited

U.S. PATENT DOCUMENTS

| 5,028,119 | A | * | 7/1991 | Hegg | ................. | G02B 27/0018 340/980 |
| 5,237,455 | A | * | 8/1993 | Bordo | ................ | G02B 27/0101 359/602 |
| 5,296,868 | A | * | 3/1994 | Itami | .................. | G02B 27/0101 345/7 |

(Continued)

FOREIGN PATENT DOCUMENTS

| JP | 2009-515768 A | 4/2009 |
| WO | WO-2012/007305 A1 | 1/2012 |

OTHER PUBLICATIONS

International Search Report and Written Opinion dated May 16, 2014, issued for PCT/JP2013/002910.

*Primary Examiner* — Bao-Luan Le
(74) *Attorney, Agent, or Firm* — Locke Lord LLP (57) ABSTRACT

There is provided a vehicle display device, which comprises a base to be connected to a vehicle, a reflective panel being extendable from the base and retractable into the base, a projecting means for projecting an image to be displayed to the reflective panel, a cover for covering a front side of the reflective panel in its extending direction when the reflective panel is in the retracted position, and having an arm portion extending to the base and pivotally supported by the base, and a first biasing means for biasing the cover, and a driving means disposed in the base and configured to drive the reflective panel in an extendable-and-retractable manner. The base has an interlocking member capable of being associated with movement of the reflective panel in the extendable-and-retractable manner and configured to press the arm portion.

12 Claims, 10 Drawing Sheets

(51) Int. Cl.
*G03B 21/10* (2006.01)
*G03B 21/14* (2006.01)

(56) References Cited

U.S. PATENT DOCUMENTS

| | | | | |
|---|---|---|---|---|
| 5,394,203 | A * | 2/1995 | Murphy | G02B 27/01 353/13 |
| 5,457,575 | A * | 10/1995 | Groves | B60K 35/00 353/13 |
| 5,677,701 | A * | 10/1997 | Okuyama | B60K 37/02 345/7 |
| 5,847,685 | A * | 12/1998 | Otsuki | B60K 35/00 248/920 |
| 6,049,288 | A * | 4/2000 | Kawasaki | B60K 37/00 248/27.1 |
| 6,504,518 | B1 * | 1/2003 | Kuwayama | G02B 27/01 340/980 |
| 6,657,789 | B2 * | 12/2003 | Nakamura | G02B 27/0149 359/630 |
| 6,808,274 | B2 * | 10/2004 | Raines | G02B 27/0149 359/841 |
| 6,837,581 | B1 * | 1/2005 | Raines | G02B 27/0149 353/13 |
| 6,930,836 | B2 * | 8/2005 | Harada | G02B 27/0149 359/630 |
| 7,280,282 | B2 * | 10/2007 | Kageyama | G02B 27/0101 359/630 |
| 7,528,798 | B2 * | 5/2009 | Harada | G02B 27/0101 345/7 |
| 7,936,518 | B2 * | 5/2011 | Takahashi | G02B 27/01 359/630 |
| 8,077,396 | B2 * | 12/2011 | Croy | B60K 35/00 359/632 |
| 8,427,751 | B2 * | 4/2013 | Rumpf | G02B 27/0149 345/7 |
| 9,063,327 | B2 * | 6/2015 | Moussa | G02B 7/1821 |
| 9,132,788 | B2 * | 9/2015 | Karsch | B60K 35/00 |
| 9,188,780 | B2 * | 11/2015 | Potakowskyj | G02B 27/01 |
| 2008/0285138 | A1 * | 11/2008 | Lebreton | B60K 35/00 359/630 |
| 2010/0046082 | A1 * | 2/2010 | Croy | B60K 35/00 359/632 |
| 2013/0194518 | A1 * | 8/2013 | Moussa | G02B 7/1821 349/11 |

* cited by examiner

VEHICLE DISPLAY DEVICE

TECHNICAL FIELD

The invention relates to a vehicle display device coupled to an instrument panel for a vehicle and configured to display a vehicle information, navigation information, and etc.

BACKGROUND ART

There has been proposed a wide variety of vehicle display devices, which presents data without requiring users of a vehicle to look away from their usual viewpoint. For example, see Patent Documents 1 and 2.

Figure 16A:
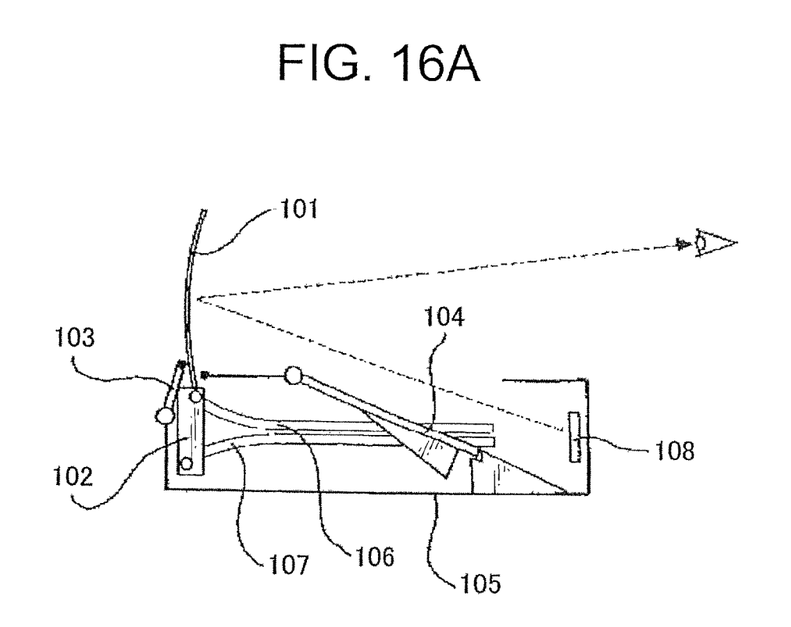
FIG. 16A is a planar view of a conventional vehicle display device in which the plate is placed in a static position.
Figure 16B:
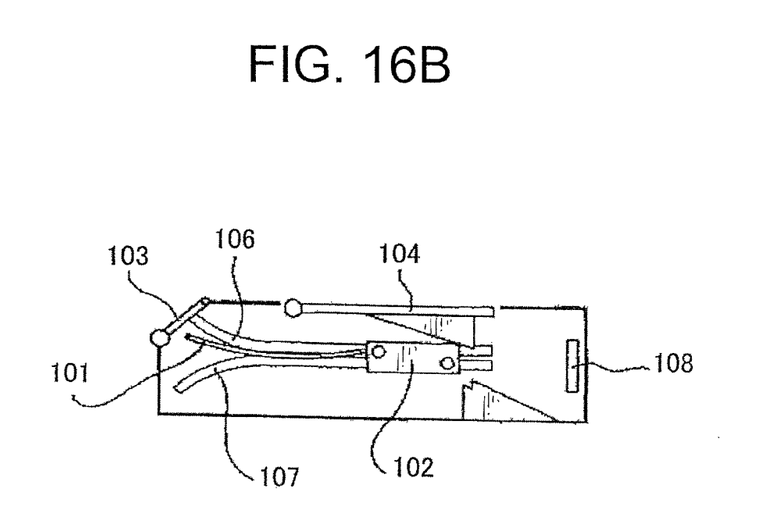
FIG. 16B is a planar view of the conventional vehicle display device in which the plate is placed in a standing position.

Referring to FIG. 16, a conventional vehicle display device is equipped with a light source 108 for generating information to be displayed, a retractable plate 101 for reflecting the information toward passengers in a vehicle, rails 106 and 107, a movable support 102 for rotatably moving the plate 101 from a static position to a standing position by guiding the plate 101 along the rails 106, 107, a control (not shown) for controlling the movement of the movable support 102, and a box-shaped housing 105 for receiving the light source 108, the plate 101, the rails 106 and 107, the movable support and the control therein. In the housing 105, there are a flap 103 for closing a first opening for inserting the plate 101 thereinto and passing the plate 101 therethrough, and a hatch 104 for closing a second opening for delivering or transporting light beam emitted by the light source 108 to the plate 101 at a standing state. The hatch 104 is coupled to the controllable motor-equipped means (not shown), which allows the hatch 104 to be closed or opened in association with the rotation of the plate 101 at from the static position to the standing position, or at the standing position to the static position.

However, the afore-mentioned conventional vehicle display device is configured to control the movement of the movable support 102 and the plate 101 by means of the control, as well as, to control the hatch 104 by means of the controllable motor-equipped means in association with the movement of the movable support 102 and the plate 101. For the above reasons, the control for associating with the operation of each part is substantially complicated, thereby rendering the constitution of the vehicle display device more complicated, and larger. As a result, the process for manufacturing the above conventional vehicle display device has been a cost-consuming job.

CITATION LIST

Patent Literature

[PTL 1]
JP 2009-515768 A
[PTL 2]
US 2010/0046082 A1

SUMMARY OF INVENTION

Technical Problem

In view of the above, the invention provides a new vehicle display device which is downsized and can be produced with reduced cost.

Solution to Problem

In order to solve the above drawbacks and problems, there is provided a vehicle display device (i.e., invention 1), which includes a base capable of being coupled to a vehicle, a reflective panel being movable between an extended position in which the reflective panel extends from the base and a retracted position in which the reflective panel is retracted into the base, a projecting means configured to project an image to be displayed on the reflective panel, a cover configured to cover a front side of the reflective panel in a direction toward the extended position when the reflective panel is in the retracted position, and having an arm portion extending to the base and pivotally supported by the base, and a first biasing means for biasing the cover, and a driving means disposed in the base and configured to drive the reflective panel in an extendable-and-retractable manner. The cover is movable between a closed position in which it can cover the front side of the reflective panel in the direction toward the extended position and an open position in which it deviates from a movement pathway of the reflective panel and a projection pathway of the projecting means toward the reflective panel. Due to the first biasing means the cover is biased toward the open position. The base has an interlocking member capable of being associated with movement of the reflective panel in the extendable-and-retractable manner and configured to press the arm portion. The interlocking member is moved in one direction when the reflective panel is moved to the retracted position. The interlocking member is provided with a second biasing means configured to bias the interlocking member toward the other direction. When the arm portion is pressed by the interlocking member, the cover is moved to the closed position against a force exerted by the first biasing means. The interlocking member is movable in the other direction when the reflective panel is moved to the extended position. Due to the force exerted by the first biasing means the interlocking member is moved via the arm portion in the other direction and the cover is moved to the open position.

In the vehicle display device in accordance with the above invention 1, there is provided a vehicle display device (i.e., invention 2) in which the arm portion is provided with a bearing pivotally supported by the base, an extended portion extending beyond the bearing beyond the base, and a projection disposed at a tip portion of the extended portion. The interlocking member is provided with an interlocking body portion slidably supported by the base, and a pressing portion configured to abut against the projection and press the projection. The pressing portion extends from the interlocking body portion toward the arm portion and extends in a direction intersecting with a direction in which the interlocking member is slidably moved, thereby allowing the projection to slide and to be pressed.

In the vehicle display device in accordance with the above invention 2, there is provide a vehicle display device (i.e., invention 3) in which the interlocking member is provided with an abutting portion capable of abutting against the projection, which is sandwiched between the pressing portion and the abutting portion.

In the vehicle display device in accordance with any one of above invention 1-3, there is provided a vehicle display device (i.e., invention 4) in which the interlocking member is provided with a second biasing member configured to bias the interlocking member toward the other direction.

In the vehicle display device in accordance with any one of above invention 1-4, there is provided a vehicle display device (i.e., invention 5) in which the reflective panel is carried by a retaining member associated with the driving means and subjected to a driving force generated by the driving means. The retaining member together with the reflective panel is movably supported by the base in extendable-and-retractable manner. The interlocking member is provided with an interlocking piece capable of abutting against the retaining member. When the retaining member abuts against the interlocking piece, the interlocking member is moved in the one direction.

In the vehicle display device in accordance with any one of above intentions 1-5, there is provided a vehicle display device (i.e., invention 6) in which a pair of the arm portions is spaced apart from each other in a direction intersecting with a direction in which the reflective panel is moved in the extendable-and-retractable manner, and a pair of the interlocking members is formed at both end portions of the base in the direction intersecting with the direction in which the reflective panel is moved in the extendable-and-retractable manner.

Advantageous Effects of Invention

In accordance with the above invention (1), control for interlocking or associating the reflective panel with the cover can be less complicated, thereby capable of further simplifying and downsizing the configuration of the vehicle display device and decreasing the cost for manufacture.

In accordance with the above invention (2), even if the projection further moves in a direction intersecting with a direction in which the interlocking member is slidably moved with respect to the cover in its open position, the projection can keep abutting against the pressing portion. As a result, the projection can be securely pressed by the pressing portion, thereby securely guiding the cover to its closed position.

In accordance with the above invention (3), even if the movement of the interlocking member or the rotation of the cover may be hindered or inhibited, the projection can be sandwiched between the abutting portion and the pressing portion, thereby allowing the projection to be securely pressed by the pressing portion. For the reason, the movement of the cover can be securely associated with the movement of the reflective panel in an extendable or retractable manner.

In accordance with the above invention (4), even if the movement of the interlocking member or the rotation of the cover may be hindered or inhibited, the first biasing means and the second biasing means respectively exert force on the interlocking member and the cover, thereby allowing the cover to be securely situated in its open position. Furthermore, due to the second biasing means the interlocking member is biased in the other direction, thereby preventing any flap of the interlocking member.

In accordance with the above invention (5), when the interlocking member (i.e., the retaining member) is moved to its retracted position, the retaining member abuts against the interlocking piece, thereby allowing the interlocking piece to move in one direction.

In accordance with the above invention (6), when the cover is moved between its closed position and its open position in association with the movement of the reflective panel in an extendable or retractable manner, the cover can be stably rotated without its inclination.

DESCRIPTION OF EMBODIMENTS

One embodiment of the vehicle display device in accordance with the invention will be hereinafter described with reference to FIGS. 1-15. In the embodiment, a head-up device as the vehicle display device is described.

A vehicle has a front window shield W at a front side of a room interior. There is provided an instrument panel P below the front window shield W.

Figure 1:
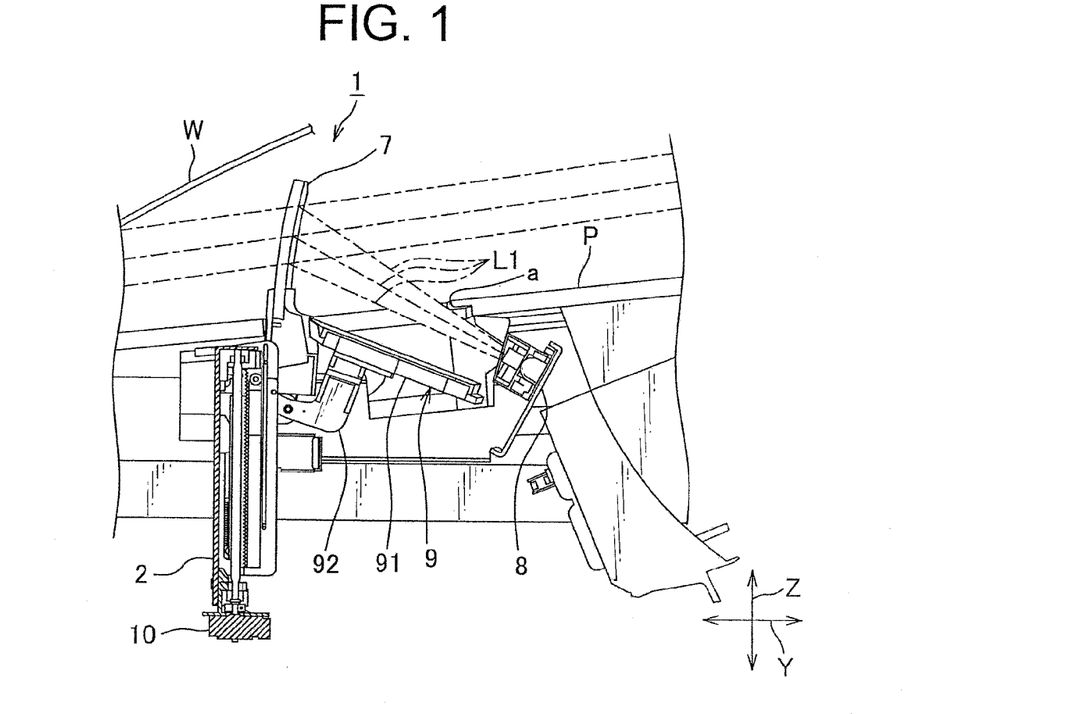
FIG. 1 is a cross-sectional view showing an interior (i.e., a room interior) equipped with one embodiment of a vehicle display body in accordance with the invention. In this drawing, a cover of the vehicle display body is placed in an open position.

The instrument panel P can be formed of, for example, black synthetic resin, and has a head-up device 1, which will be described, and a variety of operation switches (not shown). The upper face of the instrument panel P may be matte. As shown in FIG. 1, a portion of the upper face adjacent a front face of a driver's seat has an opening a for passing a reflective panel 7 of the head-up device 1 therethrough.

Figure 2:
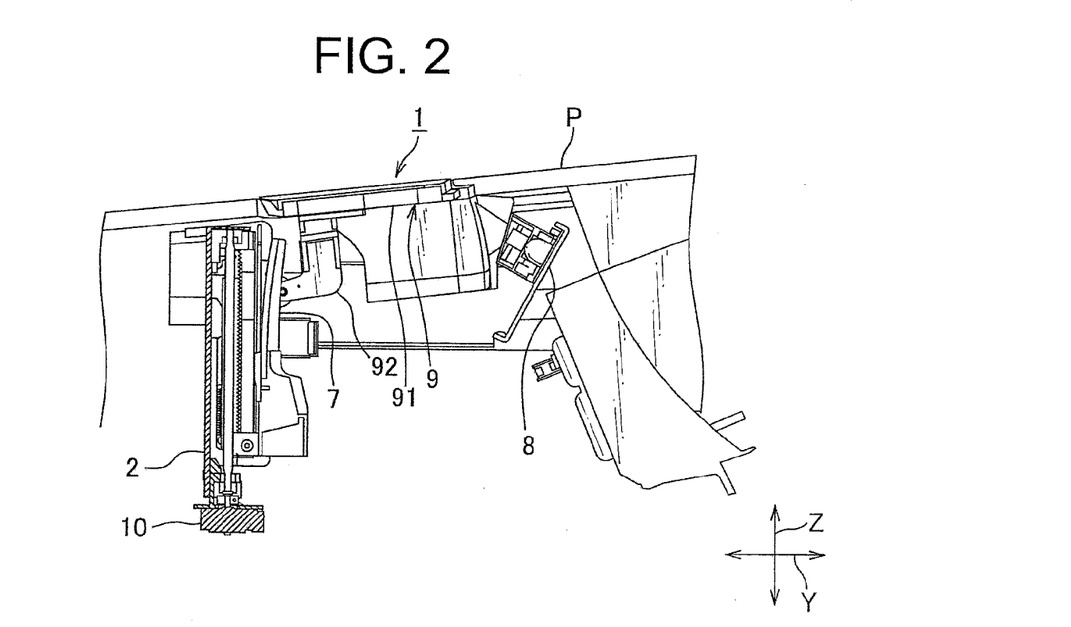
FIG. 2 is a cross-section al view of the vehicle display body of FIG. 1 the cover of which is placed in a closed position.

The head-up device 1 is configured to present display information or data such as vehicle information or navigation information. Referring to FIGS. 1 and 2, the head-up device 1 includes a base 2, a reflective panel 7 being extendable from the base 2 (i.e., the upper face of the instrument panel P) and retractable into the base 2, a cover 9 disposed forwardly of the reflective panel 7 retracted into the base 2 to cover a front side of the reflective panel 7 along a direction in which the reflective panel is extended, a projecting means 8 for projecting an image to be displayed on the reflective panel 7, and a driving means 10 for driving the reflective panel 7 to extend from the base 2 or to be retracted into the base 2.

The direction designated by an arrow "Z" in FIGS. 1 and 2 may correspond to a direction in which the reflective panel 7 extends from the base 2 and is retracted into the base 2, or a vertical direction (up-and-down direction) of the vehicle. A lower side along the vertical direction can be defined as "one direction", and an upper side along the vertical direction can be defined as "the other direction (an opposite direction)". Furthermore, a direction designated by an arrow "Y" may correspond to a front-and-back direction of the vehicle. A direction designated by an arrow "X" intersecting both the arrows Y and X may corresponds to a left-and-right direction of the vehicle.

Figure 3:
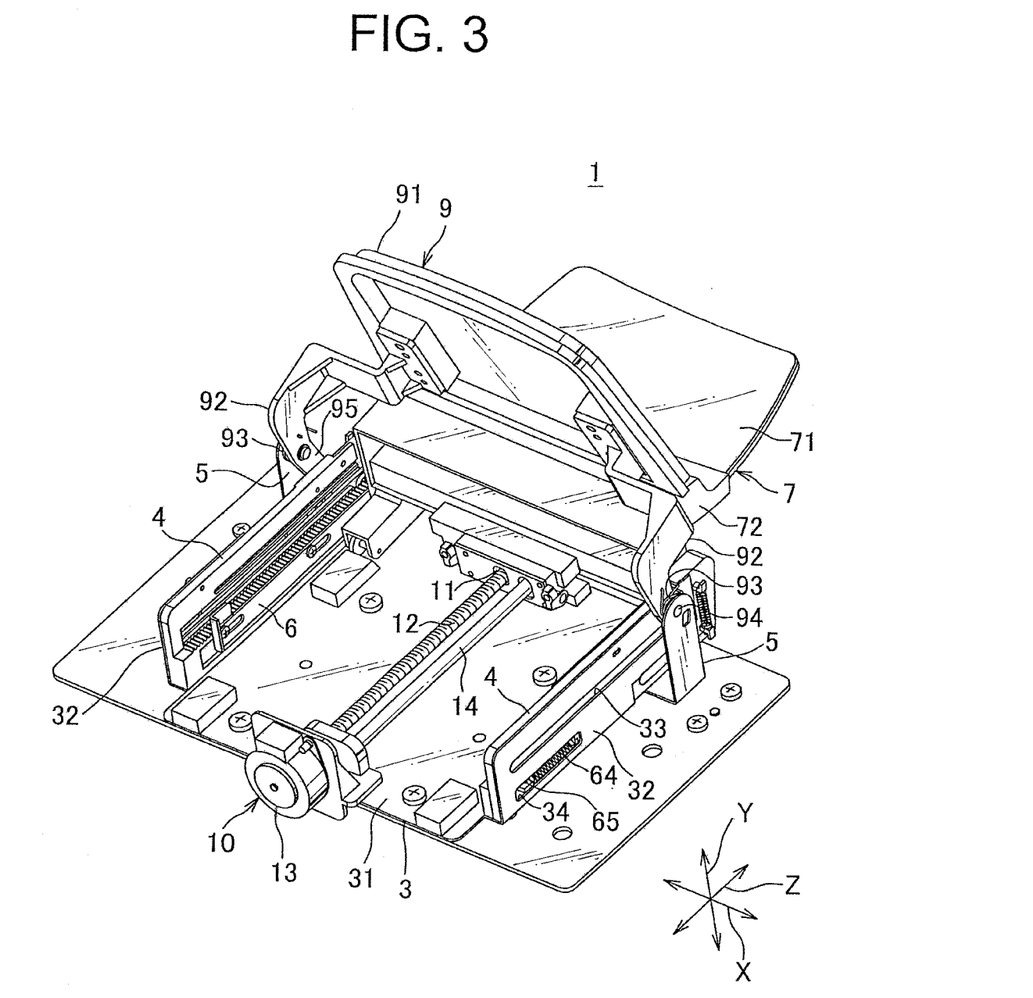
FIG. 3 is a perspective view of the vehicle display device of FIG. 1.

As shown in FIG. 3, the base 2 includes a base body 3 to be connected to the vehicle, a pair of plates 4 to be connected to the base body 3, and a pair of cover-mounting pieces 5 for connecting or mounting the cover 9 to the base body 3.

Figure 4:
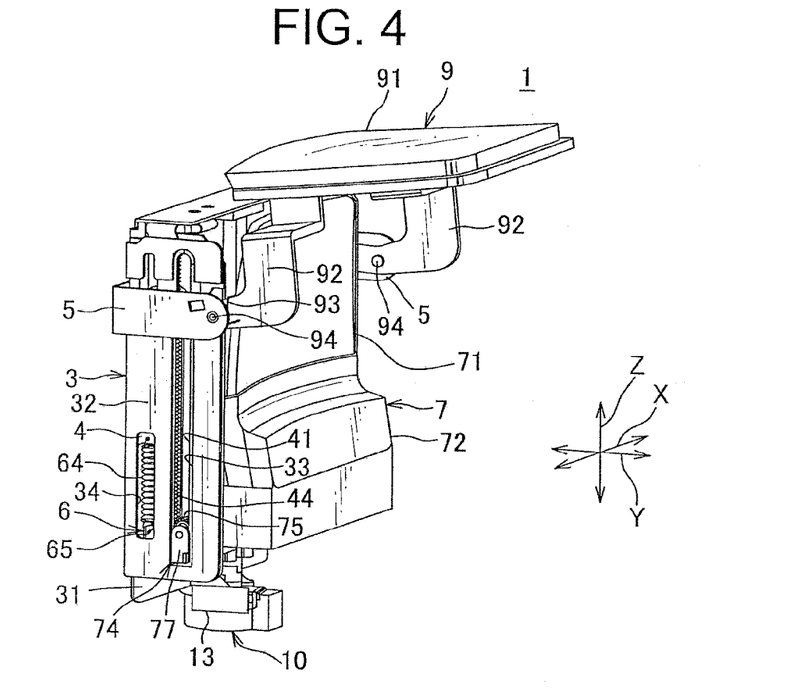
FIG. 4 is another perspective view of the vehicle display device of FIG. 1 in which a reflective panel is in its retracted position.
Figure 5:
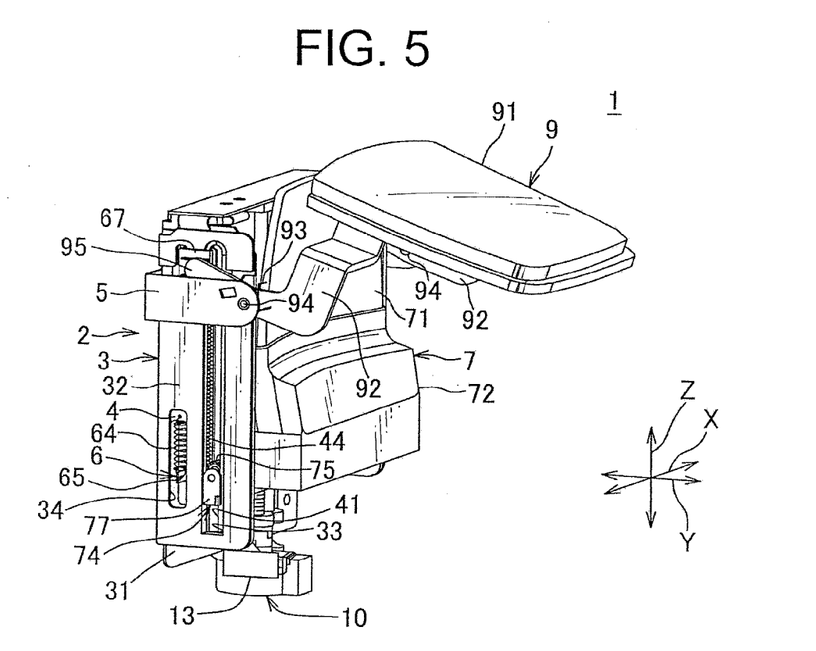
FIG. 5 is a perspective view depicting the movement or displacement of the reflective panel of FIG. 4 from its retracted position to its extended position.

Referring to FIGS. 4 and 5, the base body 3 includes a rectangular plate-shaped substrate 31 and a pair of plate-mounting portions 32 configured to respectively mount the pair of plates thereto and extending substantially perpendicular to the substrate 31. The substrate 31 is disposed such that a longitudinal direction of the substrate 31 corresponds to the vertical direction (i.e., Z direction) and the thickness direction of the substrate 31 corresponds to the front-and-back direction (i.e., Y direction). The pair of plate-mounting portions 32 extends from both edges of the substrate 31 along a thickness of the substrate 31 toward the front side, and is plate-shaped. In other words, the pair of plate-mounting portions 32 is opposed to each other in a left-and-right direction (i.e., X direction). In this regard, among left-and-right direction (i.e., X direction) an inward direction can defined by a direction in which the pair of plate-mounting portions 32 approaches each other, and an outward direction can be defined by a direction in which the pair of plate-mounting portions 32 moves away from each other.

Referring to FIGS. 4 and 5, each of the plate-mounting portions 32 includes a hole 33 for passing a guiding portion 74 of the reflective panel 7 therethrough, and a hole 34 for passing a spring-mounting piece 65, which is configured to mount a tension spring 64 (i.e., a second biasing means) of the interlocking member 6 thereto. The holes 33 and 34 are elongated in the vertical direction (i.e., Z direction) and are formed as through-holes of the plate-mounting portion 32. The holes 33 and 34 are in parallel to each other. Furthermore, the hole 33 is longitudinally disposed over the substantially overall longitudinal length of the plate-mounting portion 32. The hole 34 has a longitudinal diameter less than that of the hole 33, and is formed adjacent a lower end portion of the plate-mounting portion 32.

Figure 6:
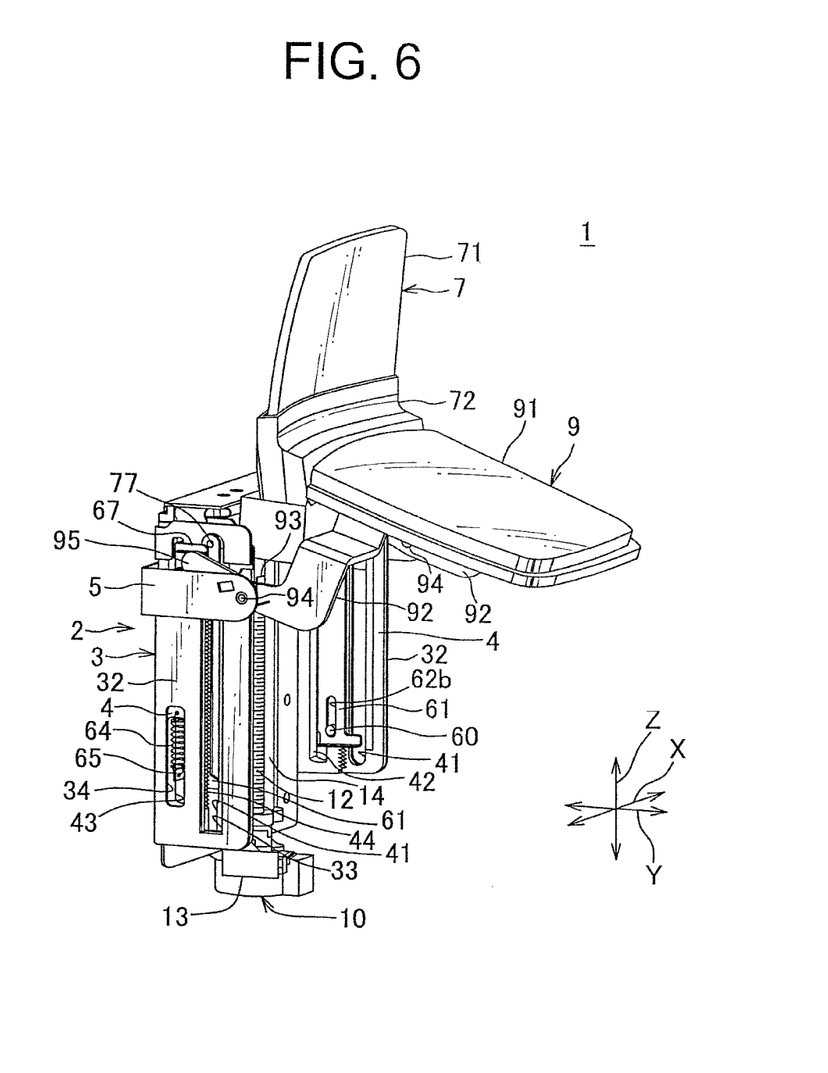
FIG. 6 is a perspective view of the reflective panel of FIG. 5 which is in its extended position.

Referring to FIG. 6, each of the pair of plates 4 includes a hole 41 communicating with the hole 33 of the base plate 3, a groove or depression 42 for inserting a insertion plate 63 of the interlocking member 6 therein, a hole 43 partly formed in a bottom of the groove or depression 42 and communicating with the hole 34, and a rack 44 engageable with a pinion 75 formed in the reflective panel 7. The hole 41 can be made much greater than the hole 33. In other words, there is a step between the edge of the hole 41 and the edge of the hole 33. The rack 44 projects from the inner surface of the plate 4 between the hole 41 and the hole 43 along the inward direction, and extends in the vertical direction.

A pair of cover-mounting portions 5 is disposed adjacent the upper end portion of the base body 3, and is opposed to the pair of the plate-mounting portions 32. Referring to FIG. 6, a bearing 94 of the arm portion 92 is pivotally supported by the cover-mounting portion 5.

Figure 7:
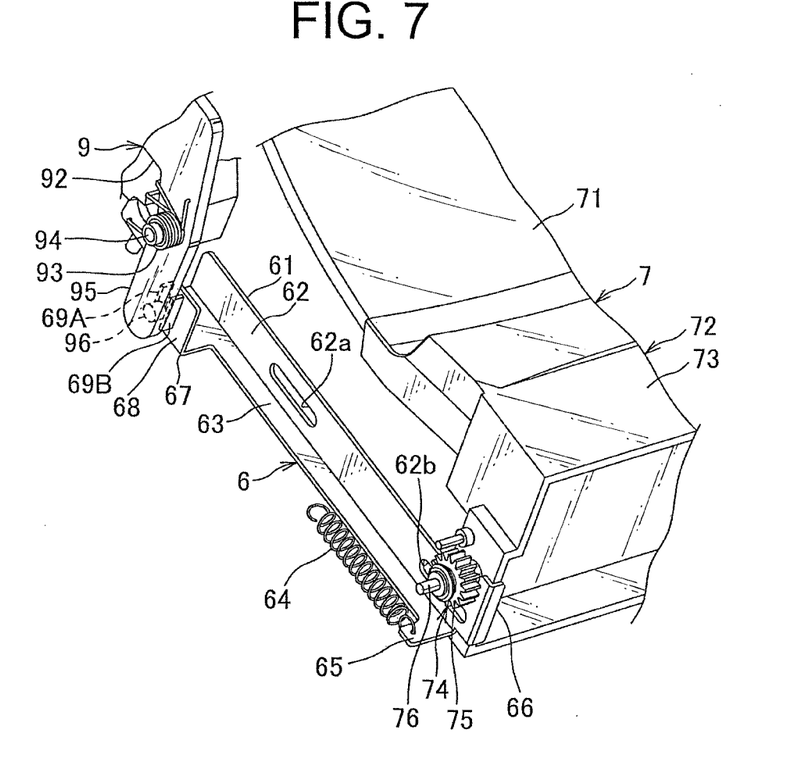
FIG. 7 is a perspective view of the reflective panel, the cover, and an interlocking member of the vehicle display device of FIG. 1.

With reference to FIG. 7, the reflective panel 7 includes a combiner 71, and a retaining member 72 coupled to the lower end portion of the combiner 71. The combiner 71 may be a known half mirror having a plate glass (not shown) and an optical semi-transmissive or semi-permeable film (not shown) formed of tin or silver plated onto one surface of the plate glass. The combiner 71 is made semipermeable, and is formed such that a driver can view foreground via the combiner 71.

Figure 8A:
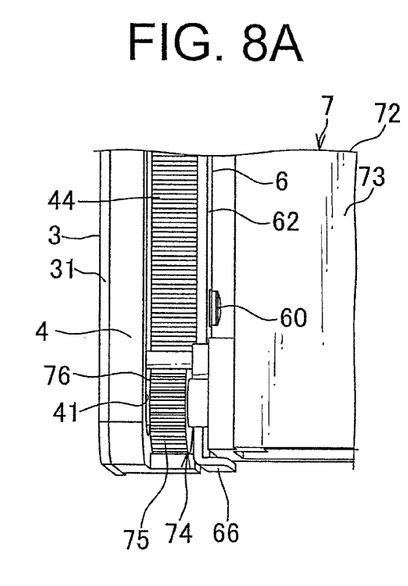
FIG. 8A is a perspective view showing the state in which the reflective panel is in its retracted position.
Figure 8B:
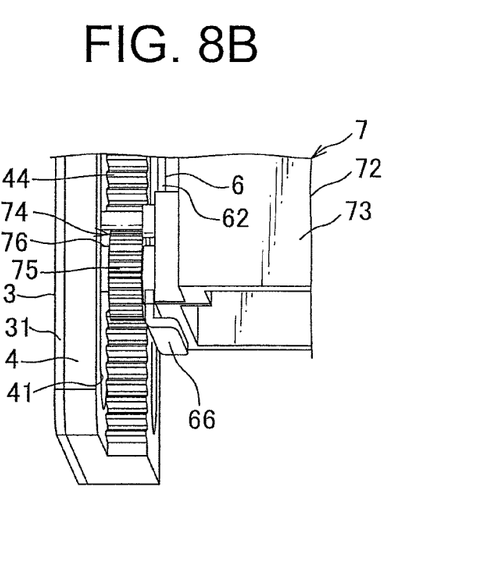
FIG. 8B is a perspective view depicting the movement or displacement of the reflective panel from its retracted position to its extended position.

As shown in FIG. 7, the retaining member 72 includes an approximately cuboid-shaped body 73, and the guiding portion 74 for slidably guiding the body 73 in a vertical direction with respect to the base 2. The guiding portion 74 is disposed in the lower end portion of the body 73, and the pinion 75 engageable with the rack 44 of the plate 4, an insertion member 76 for passing through the holes 33 and 41 of the plate 4, and a locking piece 77 (FIG. 5) for slidably locking the body 73 to the base 2. As shown in FIGS. 7 and 8, the pinion 75 engages the rack 44 of the plate 4 with the mounting plate 62 of the interlocking member 6 sandwiched between the pinion 75 and the body 73. An insertion member 76 outwardly extends from the center portion of the pinion 75. As shown in FIGS. 4 and 5, the locking piece 77 is made as approximately rectangle-shaped plate having a hole having a diameter enough to pass the insertion member 76 therethrough. The width of the insertion member 76 is made approximately equal to the width of the hole 41. The locking piece 77 is locked to the step formed between the edge of the hole 33 and the edge of the hole 41 by passing the insertion member 76 which have already passed through the holes 33 and 41 through the hole formed in the locking piece 77 from the outside. The locking piece 77 can move between the upper end and the lower end of each hole 41, 33, thereby slidably guiding the reflective panel 7 in the vertical direction with respect to the base 2. In this regard, the extended position can be defined by the position of the reflective panel 7 with respect to the base 2 when the locking piece 77 is placed in the upper end portions of the holes 33 and 41. The retracted position can be defined by the position of the reflective panel 7 with respect to the base 2 when the locking piece 77 is placed in the lower end portions of the holes 33 and 41.

The projecting means 8 may be a known liquid crystal projector, which is configured to transmit and project light on liquid crystal panel. The projecting means 8 receives a control signal from a control substrate (not shown), and then generates information to be displayed such as characters, graph, or indicia on the liquid crystal panel formed of a plurality of liquid crystals in response to the control signal. Luminescent light L1 is delivered in response to the information to be displayed by irradiating the information to be displayed from backside by means of a backlight.

Figure 9:
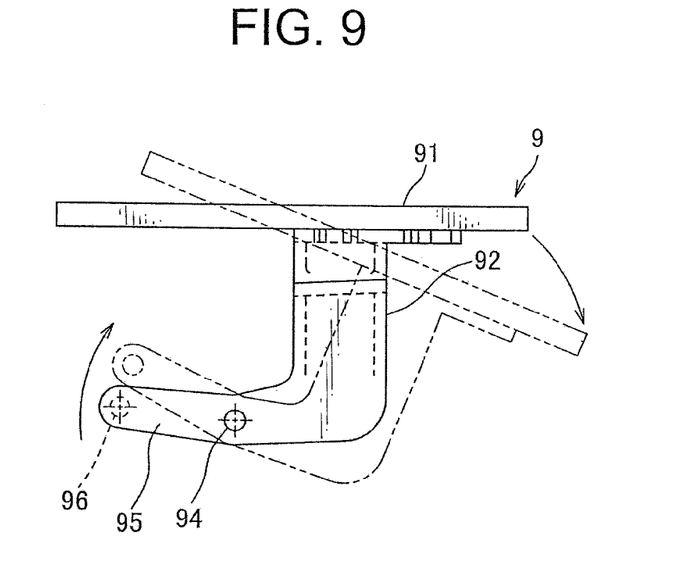
FIG. 9 shows the rotation or movement of the cover of FIG. 7.
Figure 11:
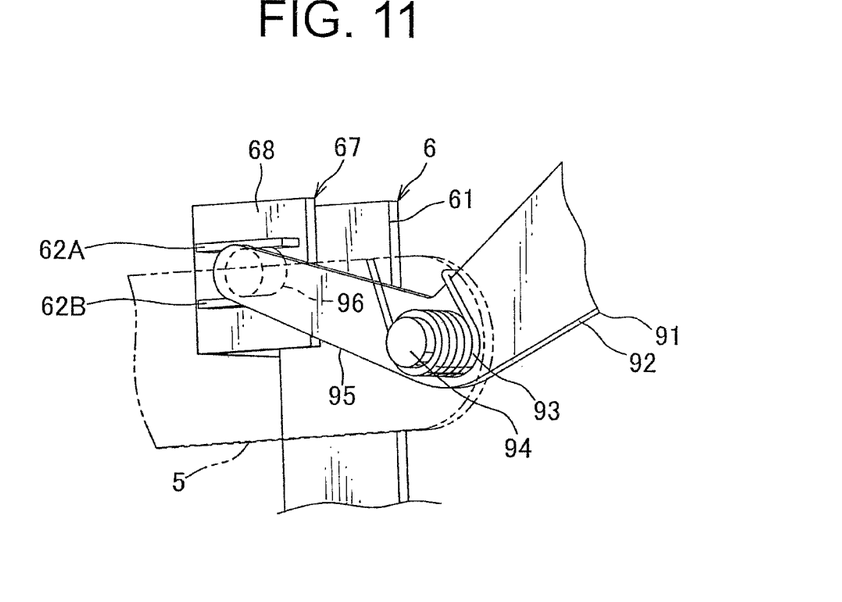
FIG. 11 is a perspective view showing the state in which an arm portion of the cover of FIG. 7 is locked to the interlocking member.

Referring to FIG. 9, the cover 9 includes a cover body 91 having a size enough to cover the opening a of the instrument panel P, an L-shaped arm portion 92 pivotally supported by the base 2 and extending toward the base 2, and a torsion spring 93 (i.e., a first biasing means) for biasing the cover body 91. The arm portion 92 includes a cylindrical bearing 94 pivotally supported by the base 2, an extended portion 95 extending beyond the bearing 94 toward the base 2, and a projection 96 disposed at the tip portion of the extended portion 95. As shown in FIG. 11, the torsion spring 93 is wound around the bearing 94, and has one end coupled to the cover-mounting piece 5 and the other end (i.e., an opposite end) coupled to the arm portion 92. As such, the torsion spring 93 is configured to bias the cover 9 toward its open position. In other words, due to the torsion spring 93 the projection 96 is biased to move upward. In this regard, the open position can be defined by the position in which the cover 9 deviates from a projecting pathway of the projecting means 8 toward the reflective panel 7 and a displacement pathway of the reflective panel 7. For more detail, see FIGS. 6 and 9 (in particular, dotted lines). To the contrary, the closed position can be defined by the position in which the front side of the reflective panel 7 along its extending direction is covered by the cover 9. For more detail, see FIG. 4 and FIG. 9 (in particular, solid line). In other words, the body 9 is rotatably supported by the base 2 between the open position and the closed position with being biased toward the open position.

Referring to FIG. 3 and etc., the driving means 10 includes a female screw 11, a feed screw 12 threaded into the female screw 11, a motor 13 for rotating the feed screw 12, and a guide 14 for vertically guiding the retaining member 72. The female screw 11 is formed such that the inner side is penetrated in Z direction. The feed screw 12 has a screw shaft. On the outer surface of the screw shaft male screw is formed. The feed screw 12 is formed along the surface of the substrate 31 in the vertical direction (i.e., Z direction). The feed screw 12 has one longitudinal end which is fixed to the motor 13, and the other longitudinal end which is rotatably supported by the retaining member 72. The driving means 10 can move the reflective panel 7 in the vertical direction (i.e., Z direction) with the male screw of the feed screw 12 in engagement with the female screw 11 by the rotation of the feed screw 12 driven by the motor 14 and accordingly relative rotation between the male screw of the feed screw 12 and the female screw 11.

A pair of the interlocking members 6 is respectively disposed in the inner side or inner surface of the pair of the plates 4. Referring to FIG. 3, the pair of the interlocking members 6 is supported such that it is vertically movable in the inner side or inner surface of the pair of plates 4. Referring to FIG. 7, each of the interlocking members 6 includes an interlocking body 61, a tension spring 64 (i.e., a second biasing means) for biasing the interlocking body portion 61 upward, a spring-mounting piece 65 for mounting one end of the tension spring 64 thereto, an interlocking piece 66 in its abutment position configured to abut against the reflective panel 7 placed in its retracted position, and a locking portion 67 for pivotally supporting the arm portion 92 of the cover 9.

Referring to FIG. 7, the interlocking body portion 61 includes the mounting plate 62 capable of being movably coupled to the inner surface of the plate 4, and a inserting plate 63 capable of being inserted into the groove or depression 42, and is L-shaped. The mounting plate 62 has two elongated holes 62a, 62b formed along the vertical direction (i.e., Z direction). The two elongated holes 62a, 62b are placed apart from each other, and have the same longitudinal diameters.

Figure 10:
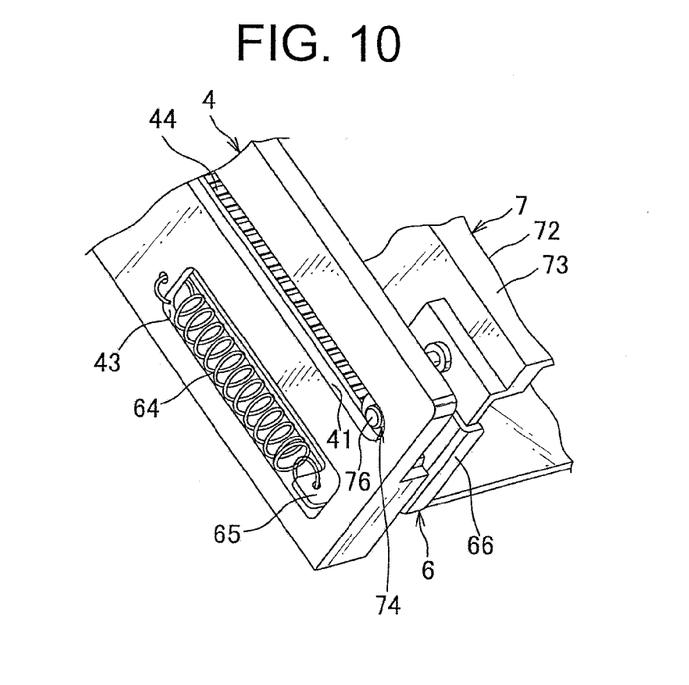
FIG. 10 is a perspective view showing the state in which the reflective panel is in its retracted position.

Referring to FIG. 10, the tension spring 64 has one end coupled to the upper edge of the hole 34 of the plate-mounting portion 32, and the other end (i.e., an opposite end) coupled to the spring-mounting piece 65 of the interlocking member 6, and is configured to bias the interlocking body portion 61 upward. The interlocking piece 66 inwardly extends from the lower end of the mounting plate 62. In other words, the interlocking piece 66 extends toward the reflective panel 7.

Referring to FIG. 11, the locking portion 67 is disposed in the upper end of the insertion plate 63, and includes a substrate portion 68 in parallel to the mounting plate 62, and a pair of plate-shaped standing portions 69A, 69B outwardly extending from the substrate portion 68 toward the arm portion 92. The pair of standing portions 69A, 69B are spaced apart from each other in the vertical direction (i.e., Z direction), and extends in the front-back direction (i.e., Y direction). A projection 96 formed on the arm portion 92 is inserted between the pair of standing portions 69A, 69B and then clamped between the pair of standing portions 69A, 69B. As a result, the cover 9 can be pivotally supported by the locking portion 67. For reference, one of the pair of standing portions 69A, 69B (i.e., an upper standing portion 69A) corresponds to a "pressing portion" as recited in the claims as appended hereto, and the other of the pair of standing portions 69A, 69B (i.e., a lower standing portion 69B) corresponds to a "abutting portion" as recited in the claims as appended hereto.

Figures 12A, 12B:
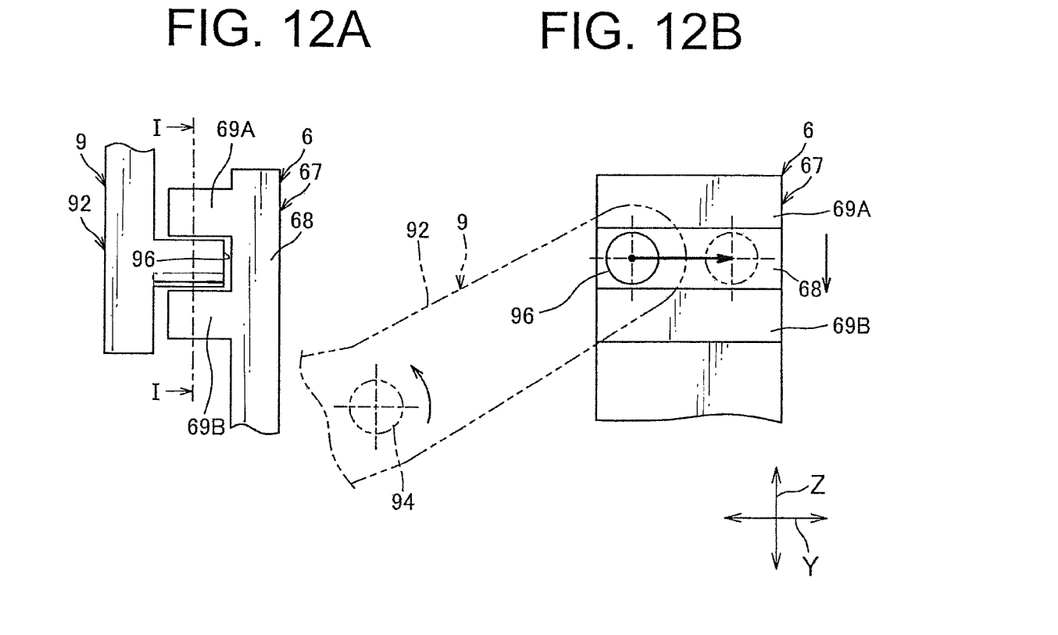
FIG. 12A is an illustrative view of the state in which the arm portion is locked to the interlocking member.
FIG. 12B is a drawing viewed from an arrow designated by "I".
Figure 13:
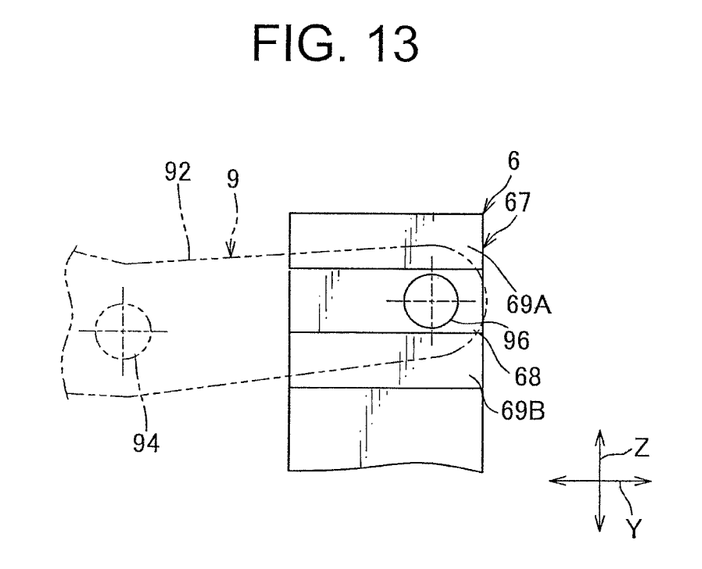
FIG. 13 is an illustrative view showing the movement or rotation of the arm portion locked to the interlocking member.
Figure 14A:
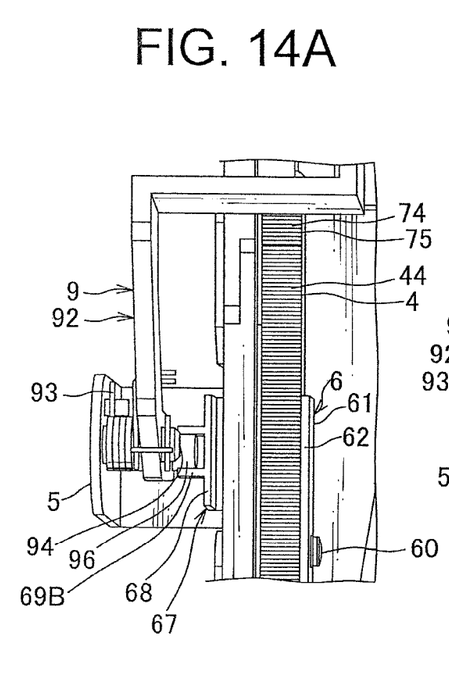
FIG. 14A is a perspective view showing the movement or rotation of the arm portion.
Figure 14B:
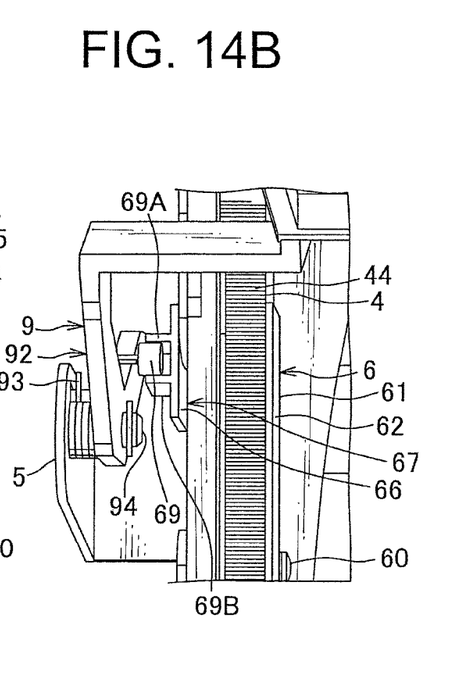
FIG. 14B is a perspective view showing the movement or rotation of the arm portion.

Referring to FIGS. 12-14, the locking portion 67 extends in the front-back direction (i.e., Y direction). For the reason, when the reflective panel 7 moves to its retracted position, the upper standing portion 69A (i.e., the pressing portion) downwardly presses the projection 96 of the arm portion 92, thereby allowing the rotation of the projection 96 about the bearing 94 of the arm portion 92. As a result, even if the projection 96 further moves in the front-and-back direction (i.e., Y direction) with respect to the cover 9 in its open position, the projection 96 can keep abutting against the upper standing portion 69A.

Figure 15A:
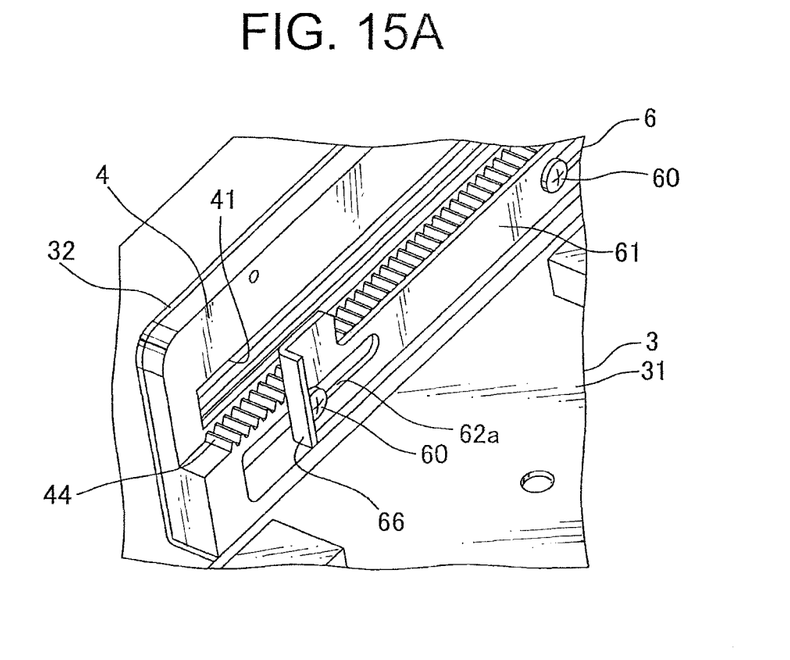
FIG. 15A is a perspective view of one embodiment in which the interlocking member is placed in the upper end of the plate.
Figure 15B:
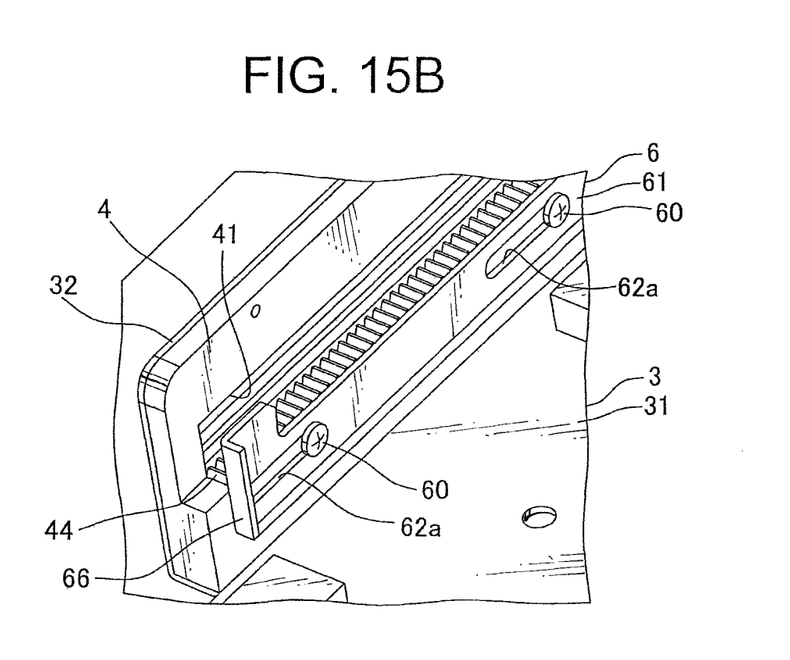
FIG. 15B is a perspective view of one embodiment in which the interlocking member is placed in the lower end of the plate.

When the interlocking member 6 lies on the inner surface of the plate 4, the insertion plate 63 is inserted into the groove or depression 42, and the mounting piece 65 passes through the holes 34 and 43. At this state, the pin 60 passes through the elongated holes 62a and 62b, thereby allowing the interlocking member 6 to be coupled to the plate 4 such that the interlocking member 6 can be moved in the vertical direction (i.e., Z direction). As the tension spring 64 upwardly biases the interlocking member 6, in a natural state as shown in FIG. 15A in which any force is exerted upon the interlocking member 6 the pin 60 is placed in the lower end portion of the elongated holes 62a, 62b. When the interlocking member 6 is downwardly moved with respect to the plate 4, the pin 60 is now placed in the upper end portion of the elongated holes 62a, 62b, as shown in FIG. 15B. As such, the interlocking member 6 can move as much as the longitudinal diameter of the elongated holes 62a, 62b.

Next, with reference to FIGS. 4-6 exemplary operation of the afore-mentioned head-up device 1 will be described.

The movement or operation of the head-up device 1 from its retracted position to its extended position is described. Referring to FIG. 4, once the motor 13 of the driving means 10 is driven with the cover 9 in its closed position, the reflective panel 7 upwardly moves from its retracted position while abutting against the interlocking piece 66. As the projection 96 is upwardly biased by the torsion spring 93, the reflective panel 7 upwardly moves. In other words, as depressing force (i.e., downward pressing force) having been exerted on the reflective panel 7 is eliminated, the projection 96 is upwardly moved and the arm portion 92 is rotated about the bearing 94, thereby the interlocking member 6 being placed in its open position. As the projection 96 upwardly moves, the standing portion 69A (i.e., the interlocking member 6) is pushed up and the interlocking member 6 is then placed in its abutment position as shown in FIG. 5. In other words, the interlocking member 6 moves only a distance from its abutment position to the retracted position, which is less than the distance from the movement distance of the reflective panel 7 from its extended position to its retracted position. In this state, as the interlocking member 6 is upwardly biased by the tension spring 64, not only the interlocking member 6 but also the projection 96 are upwardly biased due to the biasing force of the tension spring 64.

Furthermore, when the motor 13 is driven, the reflective panel 7 is further moved upward, thereby reaching its extended position. The, the driving of the motor 13 is stopped. In this state, the combiner 71 displays an image which is formed by reflecting the luminescent light L1 onto the combiner 71.

The operation or movement of the head-up device 1 from its use state to its retracted state will be described. Referring to FIG. 6, when the motor 13 of the driving means 10 is driven with the cover 9 being in its open position, the reflective panel 7 is downwardly moved from its extended position to its retracted position. As a result, the lower end of the retaining member 72 abuts against the interlocking piece 66 in its abutment position. Next the reflective panel 7 is further moved downwardly. At this state, the interlocking member 6 is downwardly pressed by the lower end of the retaining member 72 and is moved with respect to the plate 4. Simultaneously, the upper standing portion 69A, which is also defined as a pressing portion in the claims as appended hereto, presses the projection 96 downwardly, as shown in FIG. 12 and the projection 97 is downwardly moved due to pressing force of the upper standing portion 69A, as shown in FIG. 13. For the reason, the arm portion 92 is rotated about the bearing 94 thereby allowing the cover 9 being in its closed position. Simultaneously, the reflective panel 7 reaches its retracted position, and the motor 13 is stopped.

When the driving means 10 drives the reflective panel 7 to move to its retracted position, the cover 9 is rotated from its open position to the closed position in association with the afore-mentioned movement of the reflective panel 7. When the driving means 10 drives the reflective panel 7 to move to its extended position, the cover 9 is rotated from its closed position to its open position in associated with the afore-mentioned movement of the reflective panel 7. In other words, the movement of the reflective panel 7 can be associated with the movement of the cover 9 due to the driving means 10, the torsion spring 93, and the interlocking member 6. Accordingly, even if each driving means for respectively driving the reflective panel 7 and the cover 9 and each control means for respective controlling the reflective panel 7 and the cover 9 are not provided, the reflective panel 7 can be associated with the cover 9. For the reason, the control for this association or interlocking can be less complicated, thereby capable of further simplifying and downsizing the configuration of the head-up device 1 and decreasing the cost for manufacture.

As the tension spring 64 (i.e., a second biasing member) is provided to bias the interlocking member 6 upwardly, the cover 9 pivotally supported by the interlocking member 6 can be biased toward its open position. Furthermore, the cover 9 is biased to its open position due to the torsion spring 93. As a result, the tension spring 64 cooperates with and the torsion spring 93 for the same operation. For the reason, even if the vertical movement of the interlocking member 6 or the rotation of the cover 9 may be hindered or inhibited, the tension spring 64 and the torsion spring 93 respectively exert force on the interlocking member 6 and the cover 9, thereby allowing the cover 9 to be securely situated in its open position. Furthermore, due to the tension spring 64 the interlocking member 6 is upwardly biased, thereby preventing any flap of the interlocking member 6.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

REFERENCE SIGNS LIST 1 head-up device (vehicle display device)
2 base
6 interlocking member
7 reflective panel
8 projecting means
9 cover
10 driving means
64 tension spring (a second biasing means)
66 interlocking piece
69A standing portion (pressing portion)
69B standing portion (abutting portion)
72 retaining member
92 arm portion
93 torsion spring (a first biasing means)
94 bearing
95 extended portion
96 projection

The invention claimed is:
1. A vehicle display device, comprising:
a base capable of being coupled to a vehicle,
a reflective panel being movable between an extended position in which the reflective panel extends from the base and a retracted position in which the reflective panel is retracted into the base,
a projecting means configured to project an image to be displayed on the reflective panel,
a cover configured to cover a front side of the reflective panel in a direction toward the extended position when the reflective panel is in the retracted position, and having an arm portion extending to the base and pivotally supported by the base, and a first biasing means for biasing the cover, and
a driving means disposed in the base and configured to drive the reflective panel in an extendable-and-retractable manner, wherein the cover is movable between a closed position in which it can cover the front side of the reflective panel in the direction toward the extended position and an open position in which it deviates from a movement pathway of the reflective panel and a projection pathway of the projecting means toward the reflective panel, wherein due to the first biasing means the cover is biased toward the open position, wherein the base has an interlocking member being in association with movement of the reflective panel in the extendable-and-retractable manner and configured to press the arm portion, wherein the interlocking member is moved in one direction when the reflective panel is moved to the retracted position, wherein the interlocking member is provided with a second biasing means configured to bias the interlocking member toward the other direction, wherein when the arm portion is pressed by the interlocking member, the cover is moved to the closed position against a force exerted by the first biasing means, wherein the interlocking member is movable in the other direction when the reflective panel is moved to the extended position, and wherein due to the force exerted by the first biasing means the interlocking member is moved via the arm portion in the other direction and the cover is moved to the open position.

2. The vehicle display device in accordance with claim 1, wherein the arm portion is provided with a bearing pivotally supported by the base, an extended portion extending beyond the bearing beyond the base, and a projection disposed at a tip portion of the extended portion, and wherein the interlocking member is provided with an interlocking body portion slidably supported by the base, and a pressing portion configured to abut against the projection and press the projection, and wherein the pressing portion extends from the interlocking body portion toward the arm portion and extends in a direction intersecting with a direction in which the interlocking member is slidably moved, thereby allowing the projection to slide and to be pressed.

3. The vehicle display device in accordance with claim 1, wherein the reflective panel is carried by a retaining member associated with the driving means and subjected to a driving force generated by the driving means, wherein the retaining member together with the reflective panel is movably supported by the base in extendable-and-retractable manner, and wherein the interlocking member is provided with an interlocking piece capable of abutting against the retaining member, and wherein when the retaining member abuts against the interlocking piece, the interlocking member is moved in the one direction.

4. The vehicle display device in accordance with claim 1, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

5. The vehicle display device in accordance with claim 2, wherein the interlocking member is provided with an abutting portion capable of abutting against the projection, which is sandwiched between the pressing portion and the abutting portion.

6. The vehicle display device in accordance with claim 2, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

7. The vehicle display device in accordance with claim 2, wherein the reflective panel is carried by a retaining member associated with the driving means and subjected to a driving force generated by the driving means, wherein the retaining member together with the reflective panel is movably supported by the base in extendable-and-retractable manner, and wherein the interlocking member is provided with an interlocking piece capable of abutting against the retaining member, and wherein when the retaining member abuts against the interlocking piece, the interlocking member is moved in the one direction.

8. The vehicle display device in accordance with claim 5, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

9. The vehicle display device in accordance with claim 5, wherein the reflective panel is carried by a retaining member associated with the driving means and subjected to a driving force generated by the driving means, wherein the retaining member together with the reflective panel is movably supported by the base in extendable-and-retractable manner, and wherein the interlocking member is provided with an interlocking piece capable of abutting against the retaining member, and wherein when the retaining member abuts against the interlocking piece, the interlocking member is moved in the one direction.

10. The vehicle display device in accordance with claim 3, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

11. The vehicle display device in accordance with claim 7, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

12. The vehicle display device in accordance with claim 9, wherein a pair of the arm portions is spaced apart from each other in a direction intersecting with a direction in which the reflective panel is moved in the extendable-and-retractable manner, and wherein a pair of the interlocking members is formed at both end portions of the base in the direction intersecting with the direction in which the reflective panel is moved in the extendable-and-retractable manner.

* * * * *